United States Patent
Kakaiya et al.

(10) Patent No.: US 12,326,818 B2
(45) Date of Patent: Jun. 10, 2025

(54) UNIFIED ADDRESS TRANSLATION FOR VIRTUALIZATION OF INPUT/OUTPUT DEVICES

(71) Applicant: Intel Corporation, Santa Clara, CA (US)

(72) Inventors: Utkarsh Y. Kakaiya, El Dorado Hills, CA (US); Sanjay Kumar, Hillsboro, OR (US); Rajesh M. Sankaran, Portland, OR (US); Philip R. Lantz, Cornelius, OR (US); Ashok Raj, Portland, OR (US); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/745,603

(22) Filed: Jun. 17, 2024

(65) Prior Publication Data

US 2024/0338319 A1 Oct. 10, 2024

Related U.S. Application Data

(63) Continuation of application No. 18/321,490, filed on May 22, 2023, now Pat. No. 12,013,790, which is a (Continued)

(51) Int. Cl.
*G06F 12/1009* (2016.01)
*G06F 9/455* (2018.01)
(Continued)

(52) U.S. Cl.
CPC ...... *G06F 12/1009* (2013.01); *G06F 9/45558* (2013.01); *G06F 12/063* (2013.01);
(Continued)

(58) Field of Classification Search
CPC ............ G06F 12/1009; G06F 9/45558; G06F 12/063; G06F 12/1081; G06F 2009/45579;
(Continued)

(56) References Cited

U.S. PATENT DOCUMENTS

| 7,409,487 B1 | 8/2008 | Chen et al. |
| 10,846,117 B1 | 11/2020 | Steinberg |

(Continued)

OTHER PUBLICATIONS

Final Office Action, U.S. Appl. No. 16/651,786, Nov. 15, 2022, 16 pages.

(Continued)

*Primary Examiner* — Sean D Rossiter
(74) *Attorney, Agent, or Firm* — Nicholson De Vos Webster & Elliott LLP

(57) ABSTRACT

Embodiments of apparatuses, methods, and systems for unified address translation for virtualization of input/output devices are described. In an embodiment, an apparatus includes first circuitry to use at least an identifier of a device to locate a context entry and second circuitry to use at least a process address space identifier (PASID) to locate a PASID-entry. The context entry is to include at least one of a page-table pointer to a page-table translation structure and a PASID. The PASID-entry is to include at least one of a first-level page-table pointer to a first-level translation structure and a second-level page-table pointer to a second-level translation structure. The PASID is to be supplied by the device. At least one of the apparatus, the context entry, and the PASID entry is to include one or more control fields to indicate whether the first-level page-table pointer or the second-level page-table pointer is to be used.

20 Claims, 17 Drawing Sheets

Related U.S. Application Data continuation of application No. 16/651,786, filed as application No. PCT/US2017/068938 on Dec. 29, 2017, now Pat. No. 11,698,866.

(51) Int. Cl.
  *G06F 12/06* (2006.01)
  *G06F 12/1081* (2016.01)
(52) U.S. Cl.
  CPC .............. *G06F 12/1081* (2013.01); *G06F 2009/45579* (2013.01); *G06F 2009/45583* (2013.01); *G06F 2009/45591* (2013.01)
(58) Field of Classification Search
  CPC . G06F 2009/45583; G06F 2009/45591; G06F 2212/1048; G06F 2212/151; G06F 12/109; G06F 2212/651; G06F 2212/657
  See application file for complete search history.

(56) References Cited

U.S. PATENT DOCUMENTS

| | | | | |
|---|---|---|---|---|
| 2010/0011147 | A1* | 1/2010 | Hummel | G06F 9/45558 718/1 |
| 2011/0022818 | A1* | 1/2011 | Kegel | G06F 12/1081 718/1 |
| 2012/0151116 | A1 | 6/2012 | Tuch et al. | |
| 2013/0145051 | A1 | 6/2013 | Kegel et al. | |
| 2014/0068137 | A1* | 3/2014 | Kegel | G06F 12/1081 711/6 |
| 2015/0356023 | A1 | 12/2015 | Peter et al. | |
| 2016/0224474 | A1 | 8/2016 | Harriman | |
| 2017/0031719 | A1* | 2/2017 | Clark | G06F 12/0811 |
| 2017/0344490 | A1 | 11/2017 | Blagodurov et al. | |
| 2018/0253377 | A1 | 9/2018 | Liang et al. | |
| 2018/0293183 | A1 | 10/2018 | Cooray et al. | |
| 2018/0321985 | A1 | 11/2018 | Kakaiya et al. | |
| 2019/0108106 | A1* | 4/2019 | Aggarwal | G06F 13/4282 |
| 2019/0114283 | A1 | 4/2019 | Deval et al. | |
| 2019/0347125 | A1* | 11/2019 | Sankaran | G06F 9/3842 |
| 2019/0370050 | A1 | 12/2019 | Kumar et al. | |
| 2020/0117624 | A1 | 4/2020 | Kumar et al. | |
| 2021/0004338 | A1 | 1/2021 | Marolia et al. | |
| 2021/0271481 | A1* | 9/2021 | Tian | G06F 13/4221 |

OTHER PUBLICATIONS

International Preliminary Report on Patentability, PCT App. No. PCT/US2017/068938, Jul. 9, 2020, 11 pages.

International Search Report and Written Opinion, PCT App. No. PCT/US2017/068938, Sep. 20, 2018, 15 pages.

Non-Final Office Action, U.S. Appl. No. 16/651,786, Apr. 8, 2022, 16 pages.

Notice of Allowance, U.S. Appl. No. 16/651,786, Mar. 2, 2023, 8 pages.

Notice of Allowance, U.S. Appl. No. 18/321,490, Feb. 28, 2024, 10 pages.

Requirement for Restriction/Election, U.S. Appl. No. 16/651,786, Jan. 11, 2022, 6 pages.

* cited by examiner

UNIFIED IOMMU ARCHITECTURE

UNIFIED IOMMU ARCHITECTURE WITH RID2PASID

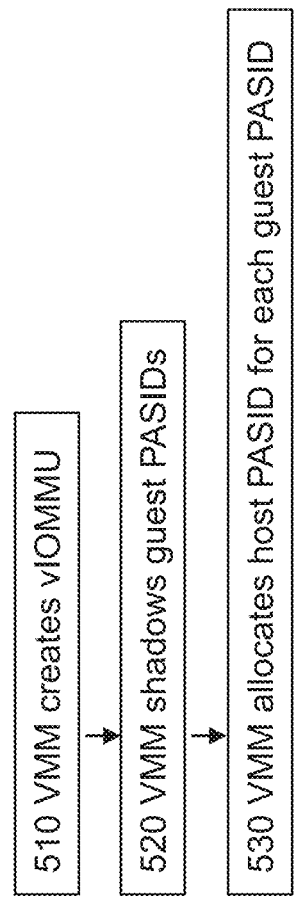

UNIFIED PASID MANAGEMENT FOR SR-IOV AND SCALABLE IOV

METHOD 600

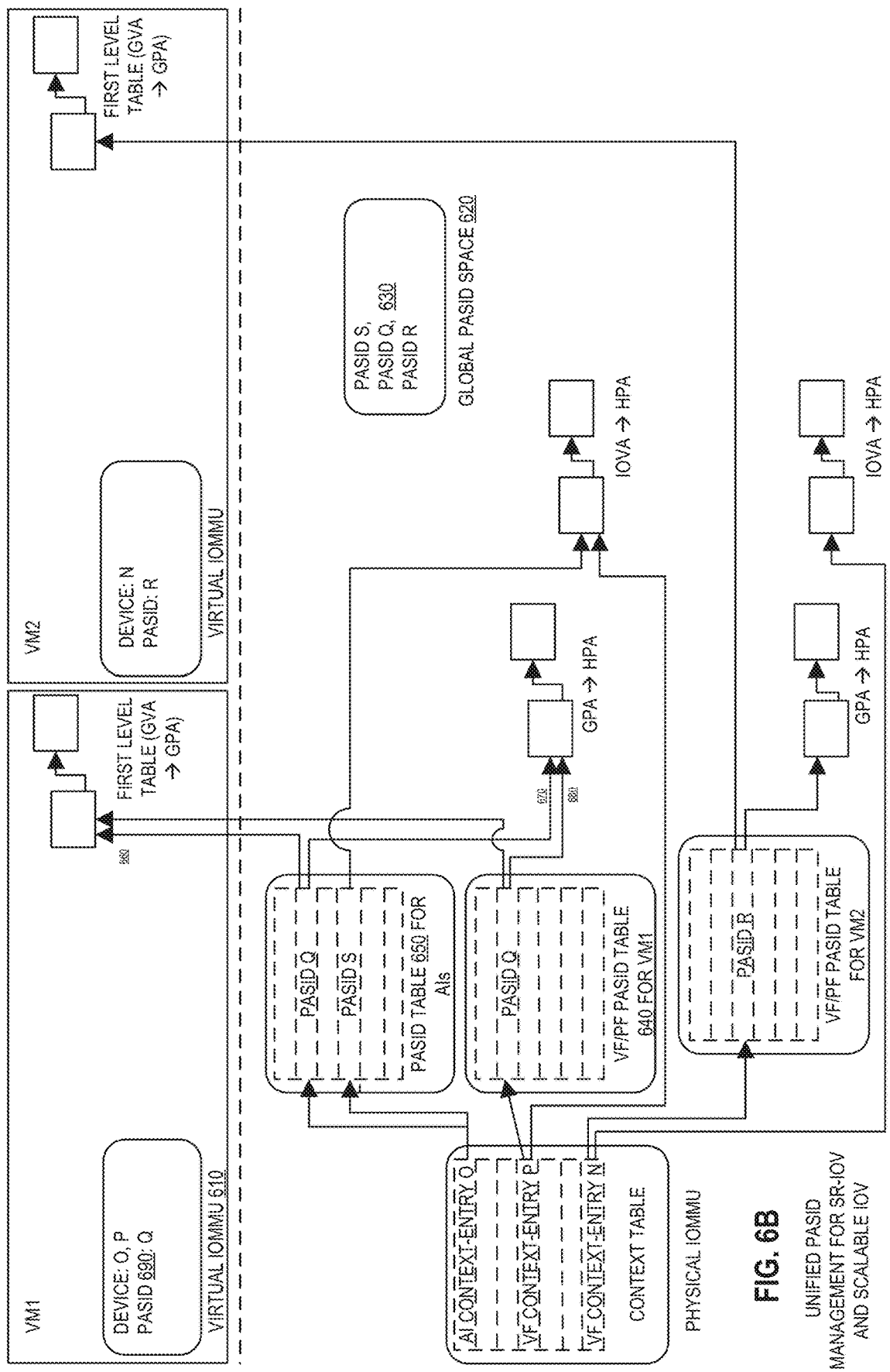

METHOD 700

710 VMM intercepts GIOVA-to-GPA mappings to program GIOVA-to-HPA mappings

720 VMM programs GPA-to-HPA mappings for SVM

METHOD 750

IOMMU 800 WITH NESTED SECOND LEVEL TRANSLATION STRUCTURE

UNIFIED ADDRESS TRANSLATION FOR VIRTUALIZATION OF INPUT/OUTPUT DEVICES

FIELD OF INVENTION

The field of invention relates generally to computer architecture, and, more specifically, but without limitation, to virtualization in computer systems.

BACKGROUND

Computers and other information processing systems may include one or more subsystems or components, such as input/output (I/O) devices, that may independently access a system memory, for example, using direct memory access (DMA) transactions and/or be accessed by one or more processors. Various system capabilities, such as virtualization, may result in different views of system memory for different I/O devices. Therefore, various address translation techniques for virtualization of I/O devices have been developed.

BRIEF DESCRIPTION OF THE DRAWINGS

The present invention is illustrated by way of example and not limitation in the figures of the accompanying drawings, in which like references indicate similar elements and in which:

FIG. 5A is a flow diagram illustrating a method of process address space identifier (PASID) management according to an embodiment of the invention;

FIG. 6B is a block diagram illustrating an IOMMU architecture for PASID management according to an embodiment of the invention;

DETAILED DESCRIPTION

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, as used in descriptions of embodiments of the invention, a "/" character between terms may mean that an embodiment may include or be implemented using, with, and/or according to the first term and/or the second term (and/or any other additional terms).

Various techniques, for example, single-root I/O virtualization (SR-IOV), as defined by the Peripheral Component Interconnect Express (PCIe) specification, and scalable I/O virtualization (Scalable IOV), as described below, may provide for virtualization of I/O devices. A system may include hardware, such as an I/O memory management unit (IOMMU) to perform address translation and/or remapping to support transactions between various I/O devices, system memory, and processors. The use of embodiments of the invention may be desired to provide a unified approach to address translation for virtualization of I/O devices, for example, to support various virtualization and/or remapping techniques using a single IOMMU.

Figure 1:
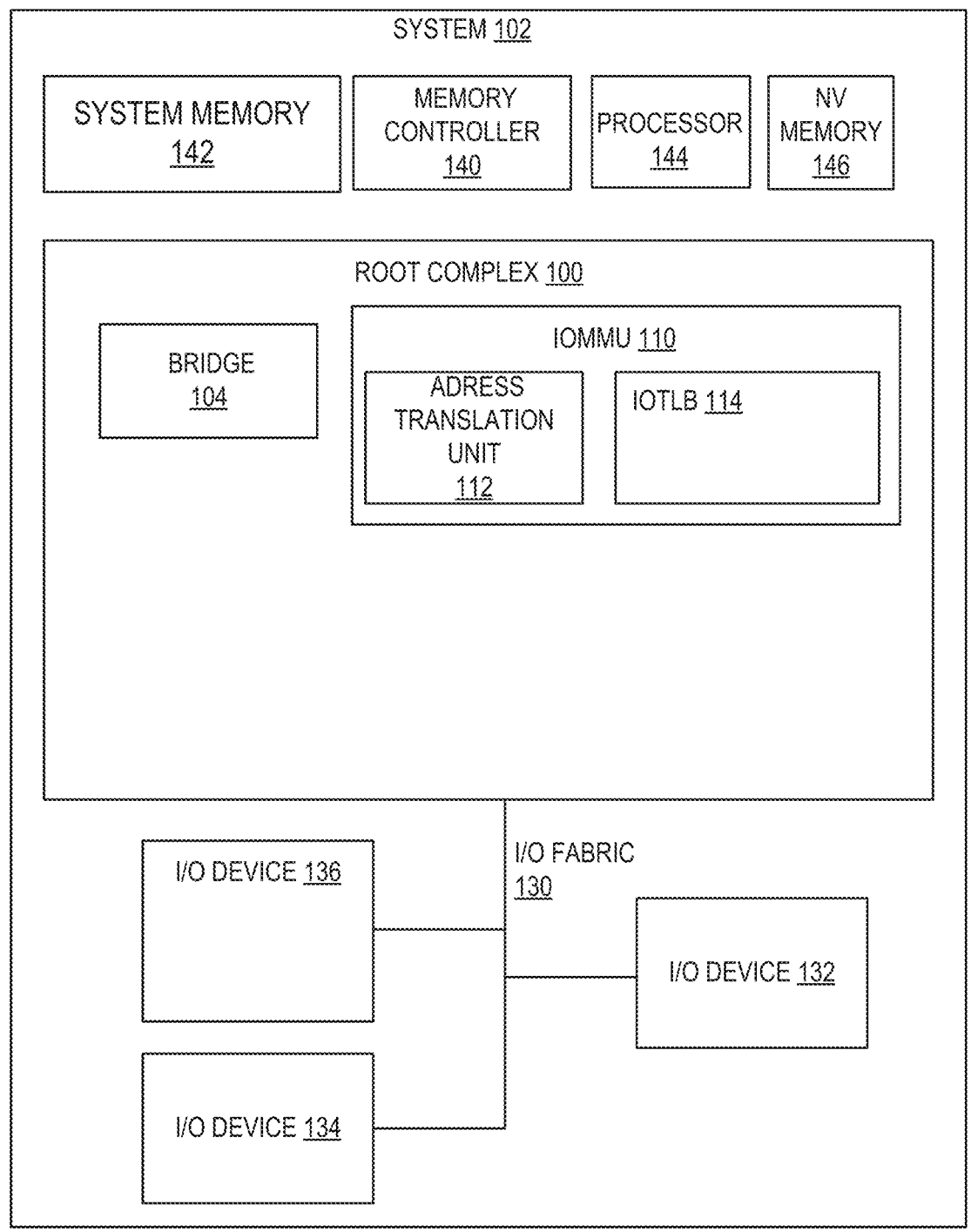
FIG. 1 is a block diagram illustrating a root complex in a system according to an embodiment of the invention.

FIG. 1 is a block diagram illustrating a root complex or other device including or serving as a bridge between one or more I/O devices and system memory according to an embodiment of the invention. Root complex 100 in FIG. 1 may be implemented in logic gates, storage elements, and any other type of circuitry, all or parts of which may be included in a discrete component and/or integrated into the circuitry of a processing device or any other apparatus in a computer or other information processing system. In FIG. 1, root complex 100 is shown within system 102. Also, FIGS. 9 through 14 show processors and systems that may include embodiments of the invention. For example, root complex 100 and/or any or all the elements shown in root complex 100 may be represented by or included in controller hub 1120, chipset 1290, or DMA unit 1432, each as described below.

Root complex 100 may represent any circuitry or component, such as a chipset component, including or through which I/O, peripheral, and/or other components or devices, such as touchscreens, keyboards, microphones, speakers, other audio devices, cameras, video or other media devices, motion or other sensors, receivers for global positioning or other information, network interface controllers, compute or other accelerators, and/or information storage devices, may be connected or coupled to a processor, a memory controller, a system memory, and/or any type of processor/memory subsystem.

System 102 and any other system embodying the invention may include any number of each of these components and any other components or other elements. Any or all of the components or other elements in this or any system embodiment may be connected, coupled, or otherwise in communication with each other through any number of buses, point-to-point, or other wired or wireless interfaces or interconnects, unless specified otherwise. Any components or other portions of system 102, whether shown in FIG. 1 or not shown in FIG. 1, may be integrated or otherwise included on or in a single chip (a system-on-a-chip or SOC), die, substrate, or package.

System memory 142 may be dynamic random access memory (DRAM) or any other type of medium readable by processor 144. System memory 142 may be used to provide a physical memory space from which to abstract a system memory space for system 102. The content of system memory space, at various times during the operation of system 102, may include various combinations of data, instructions, code, programs, software, and/or other information stored in system memory 142 and/or moved from, moved to, copied from, copied to, and/or otherwise stored in various memories, storage devices, and/or other storage locations (e.g., processor caches and registers) in system 102. Memory controller 140 may represent any circuitry or component for accessing, maintaining, and/or otherwise controlling system memory 142.

The system memory space may be logically organized, addressable as, and/or otherwise partitioned (e.g., using any known memory management, virtualization, partitioning, and or other techniques) into regions of one or more sizes. In various embodiments, such regions may include 4K-byte pages, so, for convenience, such regions may be referred to in this description as pages; however, the use of the term "page" in this description may mean any size region of memory.

Processor 144 may represent all or part of a hardware component including one or more processors or processor cores integrated on a single substrate or packaged within a single package, each of which may include multiple execution threads and/or multiple execution cores, in any combination. Each processor represented as or in processor 144 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 144 may be architected and designed to operate according to any instruction set architecture (ISA).

Nonvolatile memory 146 may be any type of nonvolatile memory and may be used to store any code, data, or information to be maintained during various power states and through various power cycles of system 102. For example, nonvolatile memory 146 may be used to store basic input/output system (BIOS) or other code that may be used for booting, restarting, and/or resetting system 102 or any portion of system 102.

Root complex 100 includes bridge 104, which may include any circuitry, other hardware, or firmware to connect a memory side (e.g., a subsystem including system memory 142) of system 102 to an I/O side (e.g., a subsystem including I/O devices 132, 134, and 136) of system 102, and/or to deliver, forward, translate, associate, and/or otherwise bridge transactions or other communications between the memory side and the I/O side.

Root complex 100 also includes IOMMU 110 and is connected to I/O devices 132, 134, and 136 through I/O fabric 130. Root complex 100 may also be connected, directly or indirectly, to memory controller 140, system memory 142, processor 144, and/or nonvolatile memory 146, any or all of which may be integrated onto the same silicon chip or other substrate as root complex 100.

IOMMU 110 includes address translation unit 112, which may represent or include any address translation circuit or logic to translate addresses that may be used by I/O or other peripheral devices to request an access to system memory 142 to addresses that may be used to access system memory 142 (IOMMU DMA remapping). For convenience, the first type of address may be referred to as an I/O-side memory address, and may include addresses used by I/O devices in DMA transactions, addresses used by I/O devices in virtual environments, and/or any other addresses used by I/O or other peripheral devices or within address spaces as seen by I/O or other peripheral devices. The second type of address may be referred to as a memory-side memory address, and may include addresses used by memory controller 140 to access system memory 142, such as a host physical address (HPA), and/or any other address within an address space on the system memory side of root complex 100. Address translation unit 112 may use any number of page tables, extended page tables, nested page tables, or other non-hierarchical or hierarchical data structures stored in system memory 142 or elsewhere to perform any number of page walks, lookups, or other translation techniques. IOMMU 110 also includes IOTLB 114 to store translations generated by address translation unit 112 or otherwise useful for finding memory-side memory addresses corresponding to I/O-side memory addresses and/or vice versa.

I/O fabric 130 may represent any bus, interconnect, or fabric, such as a PCIe interconnect, through which I/O and/or peripheral devices, such as I/O devices 132, 134, and 136 may be coupled or connected to root complex 100. I/O devices 132, 134, and/or 136 may be devices that may be able to perform the role of a requester and/or a completer of a PCIe transaction, where a "requester" may refer to a device that is able to originate a transaction on a I/O fabric 130, a "completer" may refer to a device that is addressed and/or targeted by a requester, and a "transaction" may refer to any transaction, command, message, or communication on or through I/O fabric 130. Transactions on I/O fabric 130 may include DMA and/or other transactions through which I/O devices may access and/or request or attempt to access system memory 144. More generally, a "transaction" may be any communication involving an I/O device within a system.

In various embodiments, IOMMU 110 may include hardware, such as address translation unit 112, to perform and/or support translations and/or remappings for transactions involving any I/O device, whether connected to system memory through a bridge such as bridge 104 or directly, where the definition of I/O device may include controllers (such as bus, interconnect, and/or fabric controllers, network interface controllers (NICs, including Omnipath and 100G Ethernet), etc.), processors/accelerators (such as graphics processors, cryptographic and/or compression accelerators, etc.), devices and/or functions implemented in field programmable gate arrays or with Intel® QuickAssist Technology, and any other resources that may use or involve the use of addresses in a system, using DMA, Intel® I/O Assist Technology, or any other techniques, known and/or as described in this specification. The architecture of system 102 may provide for each such physical I/O device to be virtualized to provide one or more virtual I/O devices and/or functions per physical I/O device, such that the physical I/O devices may be assigned/allocated to and/or shared among multiple virtual machines, partitions, or containers (e.g., separate and/or isolated execution environments), supported by the system software, firmware, and/or hardware of system 102.

Any platform, system, or machine, including the "bare metal" platform shown as system 102 in FIG. 1 as well as any VM or other container abstracted from a bare metal platform, from which one or more containers are abstracted may be referred to as a host or host machine, and each VM or other such container abstracted from a host machine may be referred to as a guest or guest machine. Accordingly, the term "host software" may mean any hypervisor, virtual machine monitor (VMM), operating system (OS), or any other software that may run, execute, or otherwise operate on a host machine and create, maintain, and/or otherwise manage one or more containers, and the term "guest software" may mean any OS, system, application, user, or other software that may run, execute, or otherwise operate on a guest machine. Note that in a layered container architecture, software may be both host software and guest software. For example, a first VMM running on a bare metal platform may create a first VM, in which a second VMM may run and create a second VM abstracted from the first VM, in which case the second VMM is both host software and guest software.

For convenience, the use of the term "container process" may mean any context, task, application, software, privileged process, unprivileged process, kernel-mode process, supervisor-mode process, user-mode process, or any other process running or runnable within a container. A container may have an address space (a container address space or a guest address space) that is different from the system address space (e.g., the address space of system memory 142) or the host address space (e.g. the address space of the host machine). An address with which the system address space may be directly accessed (i.e., without translation) may be referred to as an HPA. For isolation, protection, or any other purpose, any container address space may be different from any other container address space. Therefore, each container process may access memory using addresses that are to be translated, filtered, or otherwise processed to HPAs differently than they are translated, filtered, or otherwise processed for any other container. The difference in translation/processing of container addresses may be due to virtualization and isolation of container address spaces (e.g., guest software may use guest virtual addresses (GVAs) that are translated to guest physical address spaces (GPAs) that are translated to HPAs) and may also be due to the use of a variety of different types of containers (e.g., VMs, OS-managed containers, etc.) and/or different container architectures (e.g., layered architectures including VMs hosting multiple VMs, VMs hosting multiple OS-managed containers, etc.).

An address used by a container process to access memory (a container address) may be any of many different types of addresses, including an HPA, a virtual address, a GPA, a GVA, a DMA address, etc., and may go through one or more of any of a variety of techniques, types, levels, layers, rounds, and/or steps of translation, filtering, and/or processing, in any combination, using any of a variety of data structures (e.g., page tables, extended page table, nested page tables, DMA translation tables, memory access filters, memory type filters, memory permission filters, etc.) to result in an HPA and/or in a fault, error, or any other type of determination that a requested access is not allowed. Various approaches may include layering and/or nesting of containers (e.g., a VMM hosting a VM running a guest OS, the guest OS supporting multiple containers; a VMM hosting multiple VMs each running a guest OS, etc.), involving various combinations of address translation techniques.

Each physical function within an I/O device in system 102 may become usable and/or shareable by one or more clients (e.g., containers, container processes, host processes, etc.) by reporting to system software the number of assignable interfaces (AIs) that it supports, where an AI is an abstract entity within a device through which software may submit work to the device. For example, an AI for a NIC may be a paired transmit queue and receive queue; an AI for an InfiniBand, remote DMA (RDMA), or other host fabric controller may be a Queue Pair; an AI for a Non-Volatile Memory Express or other storage device controller may be a Command Queue; an AI for a graphics processing unit (GPU), general purpose computing on GPU (GPGPU), or other accelerator may be a schedulable context through which work may be submitted; etc. An AI may have multiple command portals, which are typically MMIO addresses that software may use to submit work. An AI may be distinguished from an admin portal as being an interface for a client to submit work, whereas an admin portal is an interface through which a container host sets up or configures the AIs.

In an embodiment, an AI may be implemented with one or more 4 KB pages of memory-mapped I/O (MMIO) registers which are part of the main device (PF) base address registers (BARs). Each AI may correspond to an individual backend resource (queue, context, etc.) and implement the minimal MMIO interface to configure and operate the respective backend resource. Further, all accesses from a guest driver may be divided into control path accesses, which are infrequent accesses and hence not performance critical, and fast path accesses, which are frequent datapath accesses and hence are performance critical. Each AI's control path and fast path MMIO registers are laid out in different 4 KB pages so that the fast path registers may be mapped into the VM for direct access while control path registers may be emulated in software. One or more AIs may be assigned to a VM or as part of a virtual device (VDEV). Different AIs from the same device may also be assigned to different VMs. Virtualization of I/O devices using AIs may be scalable (Scalable IOV) because it is not limited by device/function numbers.

An I/O device may report to host software that it supports one or more AIs for use according to embodiments of the present invention, as well as how many AIs it supports, through capability/attribute information that it provides according to a system bus or interconnect specification (e.g., through a new capability added to the PCIe specification), by a device driver for the physical function, or according to any other known technique for reporting physical function capabilities/attributes.

Then, the host software may use the I/O device's admin portal to allocate, map, and/or assign each AI to a client. This assignment includes assigning a process address space identifier (PASID) to the AI, where the PASID corresponds to the address space associated with the client. In an embodiment, a PASID may be a 20-bit tag defined by the PCIe specification and carried by the translation layer packet (TLP) prefix header in transactions generated by the I/O device. After the assignment of an AI has been completed, clients may submit work requests to it according to any known approach. In an embodiment, clients may submit work requests through a shared work queue, using processor enqueuing instructions such as enqueue command (ENQCMD) and enqueue command as supervisor (ENQCMDS).

Various approaches to I/O virtualization may include support for shared virtual memory (SVM) within VMs and may involve various translations and nesting of translations, including first-level translations (e.g., from a GVA to a GPA) and/or second-level translations from (e.g., from a GPA to a HPA), for AIs and/or VFs/PFs, with or without PASIDs. Furthermore, I/O virtualization may involve virtualization of PASIDs and translations from guest PASIDs to host PASIDs, for example, in connection with shared work queues and/or ENQCMD/S instructions. Additionally, an OS (e.g., Linux) may use I/O virtual addresses (IOVA) to program DMA on I/O devices. A VF/PF transaction may involve a request including an IOVA but no PASID, while an AI transaction for the same I/O device may involve a request including a guest IOVA (GIOVA) and a PASID.

Various scenarios may arise in which the use of various I/O devices may involve different translation techniques and/or transaction attributes. The use of multiple address translation techniques may be incompatible with existing IOMMU architectures. Examples include: SR-IOV and Scalable IOV use different second level translation structures; a second level translation for an IOVA may not be available if it is used to support SVM; and use by a VM of VFs/PFs with dedicated work queues (using host PASIDs) and shared work queues (using guest PASIDs) and/or assignment of both VFs/PFs (using guest PASIDs) and AIs (using host PASIDs) to a single VM may result in a single application and/or VM using different types of remapping requests.

Figure 2:
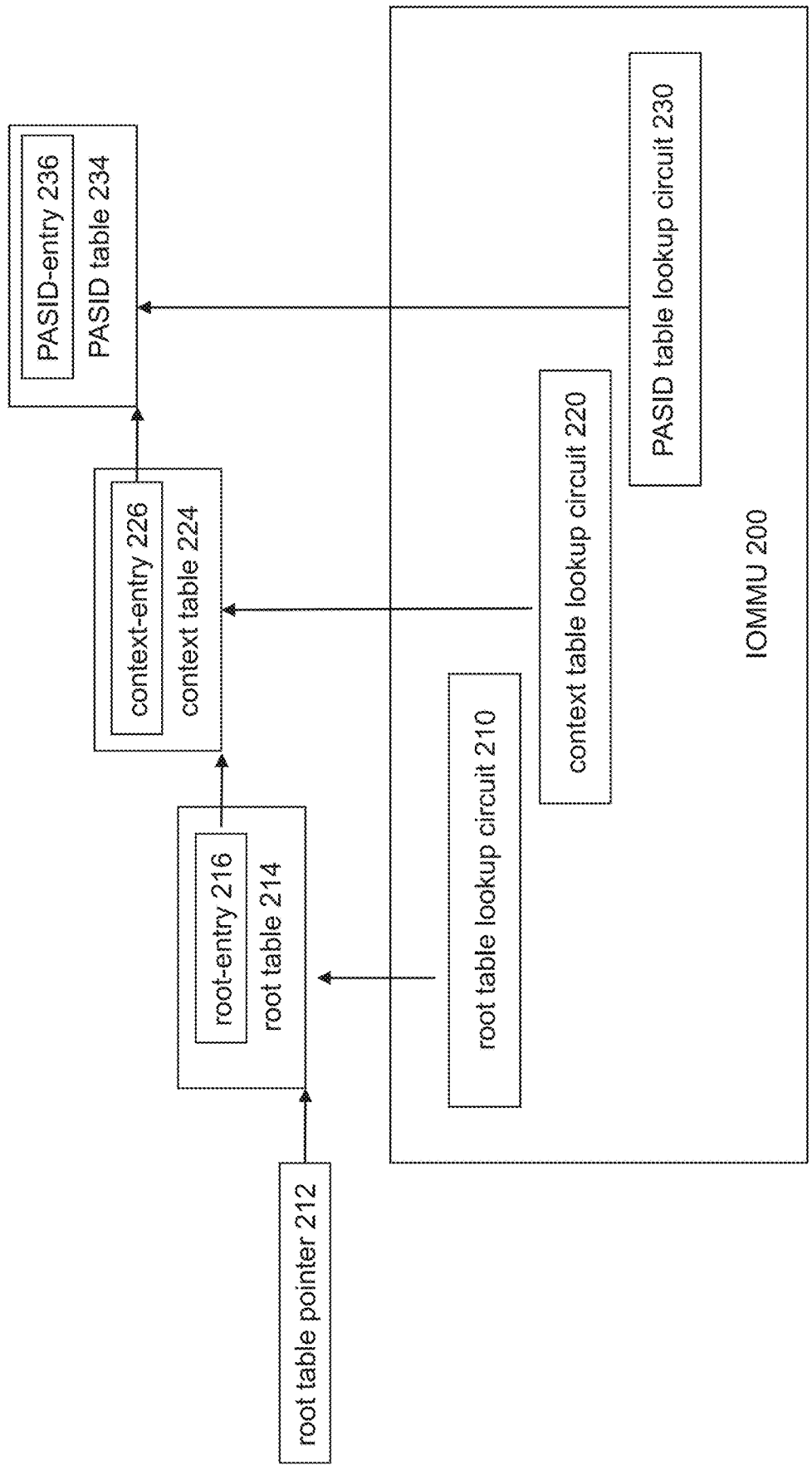
FIG. 2 is a block diagram illustrating an input/output memory management unit (IOMMU) according to an embodiment of the invention.
Figure 3:
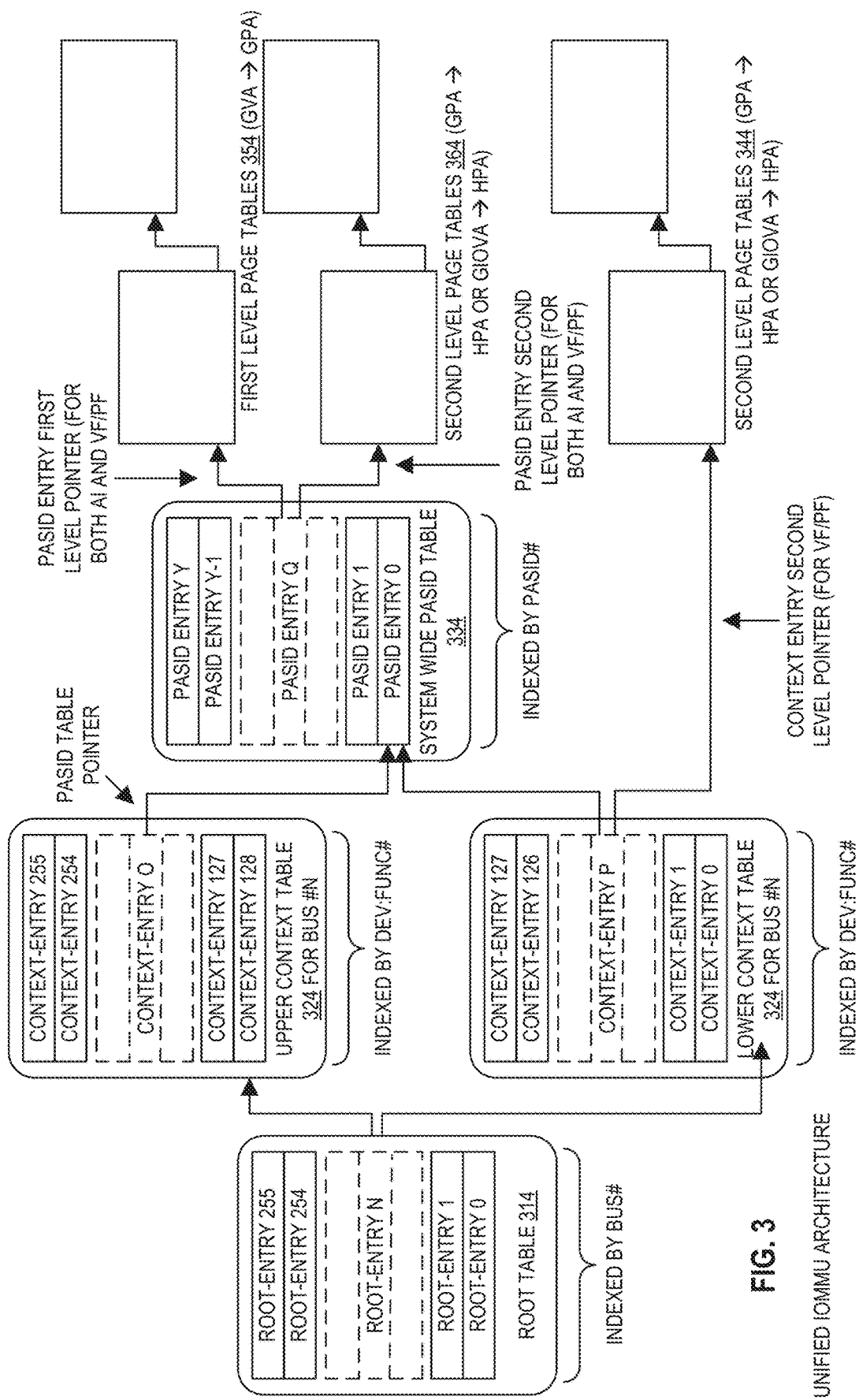
FIGS. 3 and 4 are block diagrams illustrating IOMMU architectures according to embodiments of the invention.
Figure 4:
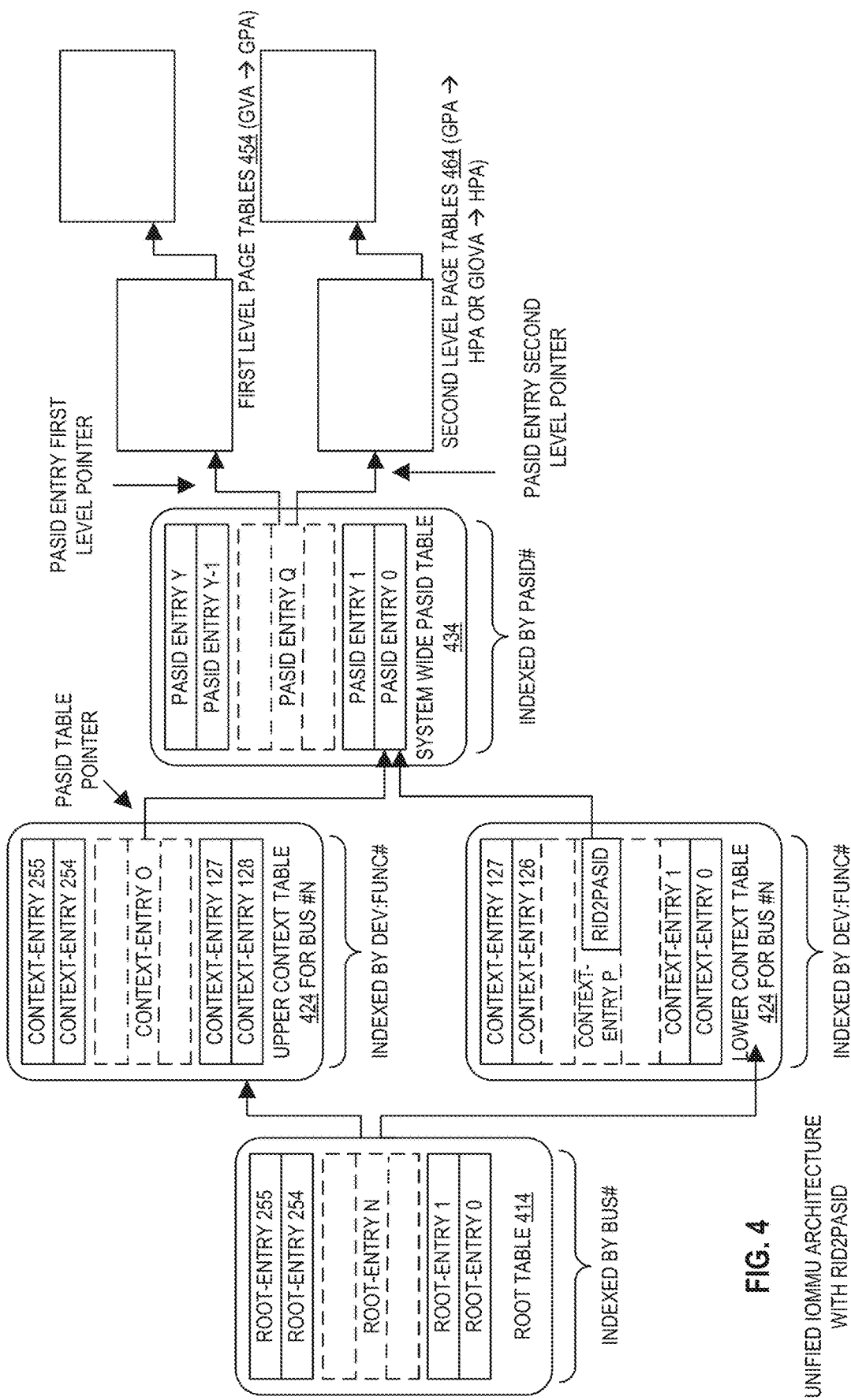

Embodiments of the invention provide for translation of addresses to support a variety of approaches to I/O virtualization, including SR-IOV and/or Scalable IOV, using a single IOMMU. FIG. 2 illustrates an IOMMU according to such an embodiment, and FIG. 3 and FIG. 4 show more detailed examples of embodiments.

In FIG. 2, IOMMU 200 may include root table lookup circuitry 210 to find an entry in a root table, such as root table 214. Root table 214 may be a data structure in local memory of IOMMU 200, in system memory, and/or elsewhere in the system, in which one or more root-entries (e.g., root-entry 216) may be stored. Root table 214 may have a root table base address stored in a root table pointer storage location 212. Root table lookup circuitry 210 may include circuitry to add a root table index to the root table base address, where the root table index may correspond to a bus number in an embodiment in which an identifier of an I/O device may include a bus number. For example, an I/O device in a system including a PCIe bus may be assigned a bus number, device number, and function number (BDF) by system configuration software or firmware.

IOMMU 200 may also include context table lookup circuitry 220 to find an entry in a context table, such as context table 224. Context table 224 may be a data structure in local memory of IOMMU 200, in system memory, and/or elsewhere in the system, in which one or more context-entries (e.g., context-entry 226) may be stored. Embodiments of the invention may include any number of context tables, each with any number of context-entry locations. Context table 224 may have a context table base address stored in a root-entry location (e.g., root-entry 216). Context table lookup circuitry 220 may include circuitry to add a context table index to the context table base address, where the context table index may correspond to a device and function number in an embodiment in which an identifier of an I/O device may include a device and function number (e.g., a PCIe BDF).

IOMMU 200 may also include PASID table lookup circuitry 230 to find an entry in a PASID table, such as PASID table 234. PASID table 234 may be a data structure in local memory of IOMMU 200, in system memory, and/or elsewhere in the system, in which one or more PASID-entries (e.g., PASID-entry 236) may be stored. Embodiments of the present invention may include any number of PASID tables, each with any number of PASID-entry locations. PASID table 234 may have a PASID table base address stored in a context-entry location (e.g., context-entry 226). PASID table lookup circuitry 230 may include circuitry to add a PASID table index to the PASID table base address, where the PASID table index may correspond to a PASID.

In translation architecture 300 of FIG. 3, root table 314 may store one or more root entries and be indexed by bus number. A root entry may include a context table pointer to point to a context table (e.g., root entry N may point to context table 324), which may store one or more scalable context entries and be indexed by device/function number. A scalable context entry may include a scalable PASID table pointer to point to a scalable PASID table (e.g., context entry O and/or P may point to system-wide PASID table 334), which may store one or more scalable PASID entries and be indexed by PASID number. A system-wide, global PASID table may be maintained by a host OS/VMM such that all context entries in all IOMMUs point to the global PASID table. In another embodiment, different IOMMUs or different context entries within each IOMMU may point to different PASID tables. In this case, the host OS/VMM still maintains a global PASID space such that PASIDs are allocated/freed from a single global (host) PASID space and only these PASID entries are configured in per-IOMMU or per-context PASID tables.

Additionally or alternatively, a context entry may include a second level pointer to point to second level page tables for translating a GPA or an IOVA/GIOVA to an HPA (e.g., context entry P may include a second level pointer to point to second level page tables 344). Therefore, translation architecture 300 may support translation requests for a VF/PF without a PASID. A context entry may include a nesting bit to specify whether a PASID table pointer and a second level pointer is to be used to perform nested translation for translation requests with a PASID.

A scalable PASID entry may include a first level pointer to point to first level page tables for translating a GVA to a GPA (e.g., PASID entry Q may include a first level pointer to point to first level page tables 354) and/or a second level pointer to point to second level page tables for translating a GPA or an IOVA/GIOVA to an HPA (e.g., PASID entry Q may include a second level pointer to point to second level page tables 364). Therefore, translation architecture 300 may support translation requests, with a PASID, for an AI and a VF/PF. A PASID entry may include one or more control fields, such as a translation type field or a nesting field, to specify whether a first level pointer or a second level pointer or both pointers are to be used to perform translation for translation requests with a PASID.

In translation architecture 400 of FIG. 4, root table 414 may store one or more root entries and be indexed by bus number. A root entry may include a context table pointer to point to a context table (e.g., root entry N may point to context table 424), which may store one or more scalable context entries and be indexed by device/function number. A scalable context entry may include a scalable PASID table pointer to point to a scalable PASID table (e.g., context entry O and/or P may point to system-wide PASID table 434), which may store one or more scalable PASID entries and be indexed by PASID number. A system-wide, global PASID table may be maintained by a host OS/VMM such that all context entries in all IOMMUs point to the global PASID table. In another embodiment, different IOMMUs or different context entries within each IOMMU may point to different PASID tables. In this case, the host OS/VMM still maintains a global PASID space such that PASIDs are allocated/freed from a single global (host) PASID space and only these PASID entries are configured in per-IOMMU or per-context PASID tables.

Additionally or alternatively, a context entry may include, instead of a second level pointer, a RID2PASID field, which may be programmed by a VMM to assign a host PASID to requests without a PASID. The VMM may also program the corresponding PASID table entry with a first and/or a second level pointer. For example, context entry P may include an RID2PASID field. Therefore, translation architecture 400 may support translation requests for a VF/PF without a PASID.

A scalable PASID entry may include a first level pointer to point to first level page tables for translating a GVA to a GPA (e.g., PASID entry Q may include a first level pointer to point to first level page tables 454) and/or a second level pointer to point to second level page tables for translating a GPA or an IOVA/GIOVA to an HPA (e.g., PASID entry Q may include a second level pointer to point to second level page tables 464). Therefore, translation architecture 400 may support translation requests, with a PASID, for an AI and a VF/PF. A PASID entry may include one or more control fields, such as a translation type field or a nesting field, to specify whether a first level pointer or a second level pointer or both pointers are to be used to perform translation for translation requests with a PASID.

Figure 5B:
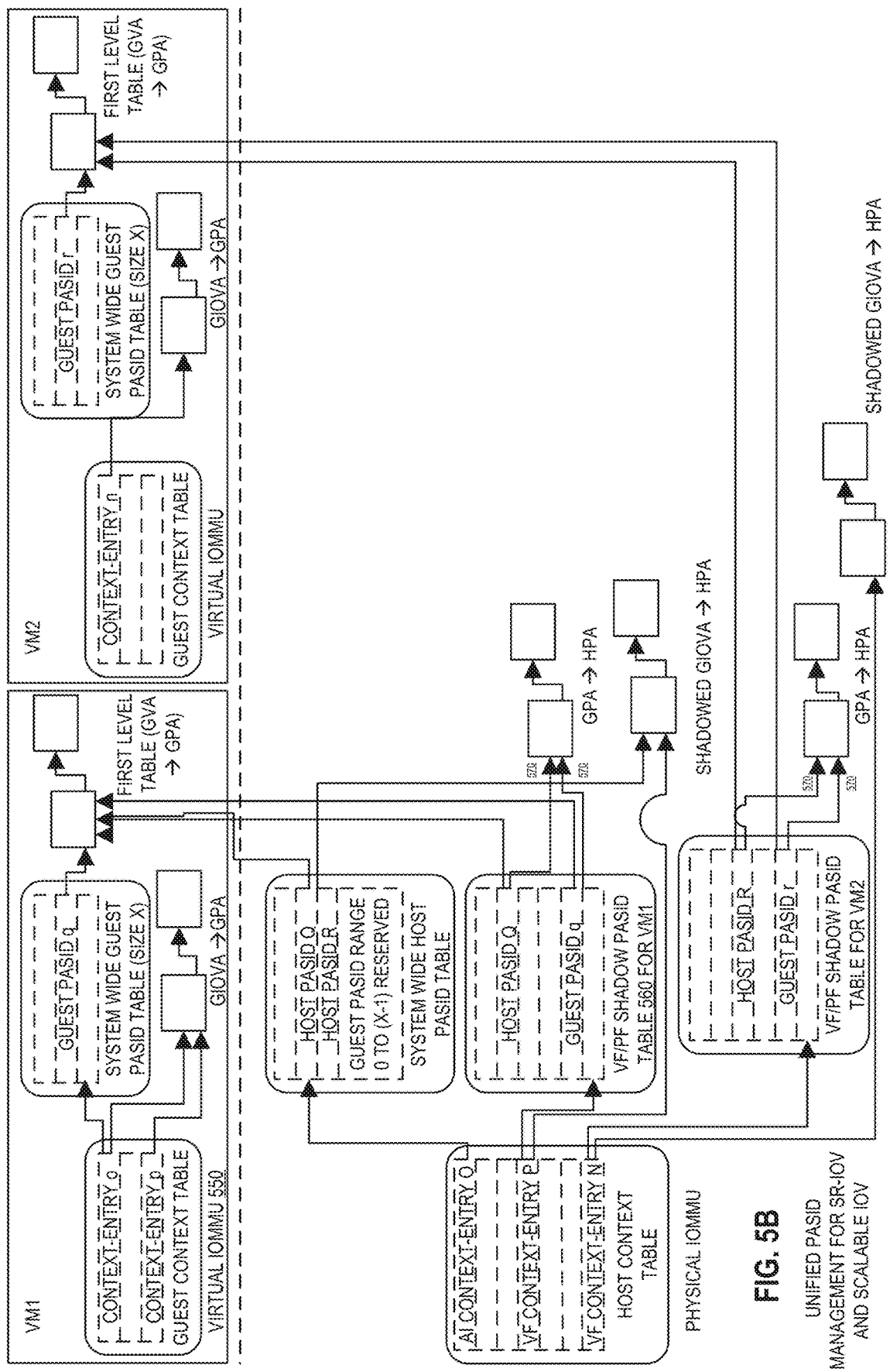
FIG. 5B is a block diagram illustrating an IOMMU architecture for PASID management according to an embodiment of the invention.

FIGS. 5A and 5B illustrate unified PASID management according to embodiments of the invention, including an IOMMU virtualization mechanism that presents a virtual IOMMU (vIOMMU) to a VM for IOVA and SVM operations. In one embodiment, the vIOMMU emulates a non-Scalable-IOV capable IOMMU (i.e., an IOMMU that can only support VFs/PFs according to SR-IOV). AIs are encapsulated in virtual devices and presented to VMs as PFs. This technique allows the VM to use the same mechanisms for VFs/PFs and AIs. For supporting GVA on both VFs/PFs and AIs assigned to a VM, the VMM shadows the guest PASID table to create a shadow PASID table for the VM in the physical IOMMU. The shadow PASID table is pointed to by the assigned VF/PF's context entry, while the AI's context entry points to the system-wide host PASID table. The VMM exposes a smaller PASID table size in the vIOMMU so the guest PASIDs occupy only a portion of the physical PASID table. The VMM configures guest PASIDs in the VM's shadowed PASID table to support assigned VFs/PFs. The VMM also allocates host PASIDs corresponding to the VM's guest PASIDs and configures them in the system-wide host PASID table to support assigned AIs. Therefore, if an application in a VM is assigned both SVM-capable VFs/PFs and AIs, the VMM may configure an application's guest PASID for VFs/PFs in the VM's shadow PASID table and the application's host PASID for AIs in the system-wide host PASID table. The VMM may also configure the application's host PASID in the VM's shadow PASID table for VFs/PFs that use ENQCMD/S instructions. The PASID entry second-level pointer may be configured to point to a second-level table for nested GPA-to-HPA translation for both VFs/PFs and AIs.

In block 510 of method 500 of FIG. 5A, a VMM creates a virtual IOMMU (vIOMMU) for a VM to which a VF/PF and an AI may be assigned and/or in which hot-plug-in of new devices is supported. The vIOMMU (e.g., vIOMMU 550 in FIG. 5B) supports a smaller PASID width than that supported by the corresponding physical IOMMU. For example, if the PASID width supported by the physical IOMMU is 20 bits, the PASID width supported by the vIOMMU may be 10 bits. Therefore, the VMM may shadow the guest PASID table of the vIOMMU to a scalable PASID table, pointed to by the VF/PFs context entry, that is private to the VF/PF device (e.g., shadow PASID table 560 in FIG. 5B).

In block 520, for each guest PASID in the guest PASID table, the VMM creates a corresponding entry in the shadowed PASID table, with nesting enabled to provide for first-level translation from the guest PASID table (GVA to GPA) and second-level translation using the host GPA-to-HPA table. If the PASID is used with a VF/PF (without ENQCMD/S), the device operates directly using the guest PASID. Since the guest PASID space is smaller than the physical PASID space, there are more PASID entries available (above the guest PASID range) in the shadowed PASID table. The PASID space above the guest PASID range is not visible to the VM, so it may be used by the VMM to configure host PASIDs in the shadowed PASID table. Additionally, the VMM never allocates or configures any host PASID values in the guest PASID range for any VMs in the system-wide host PASID table.

In block 530, to support PASID virtualization, the VMM may allocate a host PASID (above the guest PASID range) for each guest PASID used by an AI or ENQCMD/S instructions. The corresponding host PASID entry in the shadowed PASID table is also programmed with nesting enabled, with first-level table translation from the guest PASID table (GVA to GPA), and second-level translation using the host GPA-to-HPA table. The VMM also configures the host PASID entry in the system-wide host PASID table with nesting enabled for with first-level translation using the guest-PASID table (GVA to GPA), and second-level translation using the host GPA-to-HPA table.

Since the VM can program arbitrary guest PASIDs (including a guest PASID value above the guest PASID range)

into the VF/PF, the VM can cause the VF/PF to use a host PASID illegally. However, it will not cause any harm to any other VM or the VMM because the VMM configures only host PASIDs that correspond to the particular VM's guest PASIDs in its shadow PASID table. Therefore, an invalid guest PASID value programmed in the VF/PF will cause an IOMMU fault (if the guest PASID is not configured in the shadow PASID table) or will cause the VF/PF to access an address belonging to another PASID of the same VM (if the guest PASID is configured in the shadow PASID table).

For example, an application inside VM1 may be assigned both a VF/PF (physical context entry P) and an AI (physical context entry O). If the VF/PF uses a guest PASID (non ENQCMD/S based method), the IOMMU performs DMA remapping using the guest PASID in the shadowed PASID table. If the VF/PF uses a host PASID (ENQCMD/S based method), the IOMMU performs DMA remapping using the host PASID in the shadowed PASID table. If an AI does a DMA request (irrespective of ENQCMD/S), it will always be with a host PASID. In this case, the IOMMU uses the host PASID entry in the system wide host PASID table to perform DMA remapping. Since all three PASID entries are pointing to the same set of first-level and second-level translation tables, all of these DMA remapping requests will result in the same HPA addresses for the application.

An application inside a misbehaving VM2 may be assigned a VF/PF (physical context entry N) which may program an arbitrary guest PASID to the VF/PF. VM2 programs guest PASID r in its vIOMMU PASID table, which causes the VMM to configure the guest PASID r in VM2's shadow PASID table as well as allocate a host PASID R and configure it in VM2's shadow PASID table. So even if VM2 programs the VF/PF to use host PASID Q (which belongs to VM1), it cannot access VM1's memory because VM2's shadow PASID table does not have host PASID Q configured. VM2's attempt will result in an IOMMU fault instead.

Figure 6A:
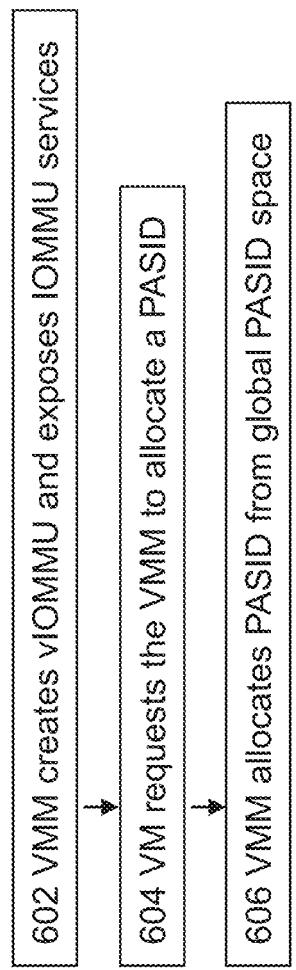
FIG. 6A is a flow diagram illustrating a method of PASID management according to an embodiment of the invention.

FIGS. 6A and 6B illustrate unified PASID management according to yet another embodiment of the invention, including an IOMMU para-virtualization mechanism in which a VMM presents a vIOMMU to a VM and exposes a set of services to configure a physical IOMMU for IOVA and SVM operations. AIs may be encapsulated in virtual devices and presented to VMs as PFs. This technique allows the VM to use the same mechanisms for VFs/PFs and AIs. For IOVA and SVM operations, the VMM uses a global PASID space rather than requiring each VM to implement its own PASID space (guest PASIDs). The VMM manages a global pool of PASIDs which is used to allocate PASIDs for Scalable IOV AIs' second-level translations (IOVA operation) and to allocate PASIDs for SVM applications running inside VMs requesting GVA operation for devices (VF/PF devices or virtual devices made-up of AIs). The VMM may control the maximum number of PASIDs allocated to a particular VM to assure a fair share of PASID space between different VMs and the VMM. The VMM may use a scalable PASID table that is private to a VF/PF device or to a VM, pointed to by the VF/PF's context entry, to support SVM operations on a VF/PF device. The VMM may use a system-wide scalable PASID table or one scalable PASID table for each physical IOMMU to support SVM operations on AIs.

In block 602 of method 600 of FIG. 6A, a VMM creates a vIOMMU for a VM to which a VF/PF and an AI may be assigned and/or in which hot-plug-in of new devices is supported. The vIOMMU (e.g., vIOMMU 610 in FIG. 6B) may not allocate its own translation tables or PASIDs, but may rely on IOMMU services provided by the VMM to achieve SVM and IOVA functionality. For each operation on vIOMMU that involves modification of IOMMU registers or IOMMU translation tables, vIOMMU software running inside a VM calls into the VMM and requests the VMM to perform the operation on its behalf. The VMM may service the request or may deny it if invalid parameters are passed in the call. The VMM creates a global PASID space (e.g. global PASID space 620 in FIG. 6B) and allocates or frees PASIDs from this PASID space based on its own needs or as a result of operations that are initiated by VMs through the vIOMMU. To enable GVA operation, vIOMMU software running in a VM may utilize IOMMU services provided by the VMM to acquire PASIDs (in block 604) to be programmed in the device and to communicate a base for GVA-to-GPA paging structures for first-level translation.

In block 606, for each vIOMMU request to enable GVA operation for the application, the VMM allocates a host PASID (e.g. PASID 630 in FIG. 6B) if one is not already allocated for it. The VMM creates a corresponding entry in the particular VM's scalable PASID table (e.g. PASID table 640 in FIG. 6B) if the request is for a VF/PF device and in the AI's scalable PASID table (e.g. PASID table 650 in FIG. 6B) if the request is for an AI, with nesting enabled to provide for first-level translation using guest GVA-to-GPA table (e.g. arrow 660 in FIG. 6B) and second-level translation using the host GPA-to-HPA table (e.g. arrow 670 or arrow 680 in FIG. 6B). The VMM also returns the host PASID to the vIOMMU software in the VM, which can be used as the guest PASID (PASID 690 in FIG. 6B) for normal guest PASID usages.

Since the VM can program arbitrary PASIDs (including a PASID value not allocated to it by the VMM) into the VF/PF, the VM can cause the VF/PF to use a PASID illegally. However, it will not cause any harm to any other VM or the VMM because the VMM configures a context-entry for the VF/PF device to use the particular VM's PASID table, in which valid entries correspond only to PASIDs that have been allocated to the particular VM by the VMM. Therefore, an invalid PASID value programmed in the VF/PF will cause an IOMMU fault (if the PASID is not configured in the particular VM's PASID table) or will cause the VF/PF to access an address belonging to another PASID of the same VM (if the PASID is configured in the particular VM's PASID table).

For example, an application inside VM1 may be assigned both a VF/PF (physical context entry P) and an AI (physical context entry O). If the VF/PF uses a PASID Q (irrespective of ENQCMD/S), the IOMMU performs DMA remapping using the PASID Q in the VM1's PASID table. If an AI does a DMA request (irrespective of ENQCMD/S), the IOMMU uses the PASID Q entry in the AI PASID table to perform DMA remapping. Since both the PASID Q entries are pointing to the same set of first-level and second-level translation tables, all of these DMA remapping requests will result in the same HPA addresses for the application.

An application inside a misbehaving VM2 may be assigned a VF/PF (physical context entry N) which may program an arbitrary PASID to the VF/PF. When VM2 requests SVM enable for an application, the VMM allocates a PASID R and configures it in VM2's PASID table. So even if VM2 programs the VF/PF to use host PASID Q (which belongs to VM1), it cannot access VM1's memory because VM2's PASID table does not have PASID Q configured. VM2's attempt will result in an IOMMU fault instead.

Figure 7A:
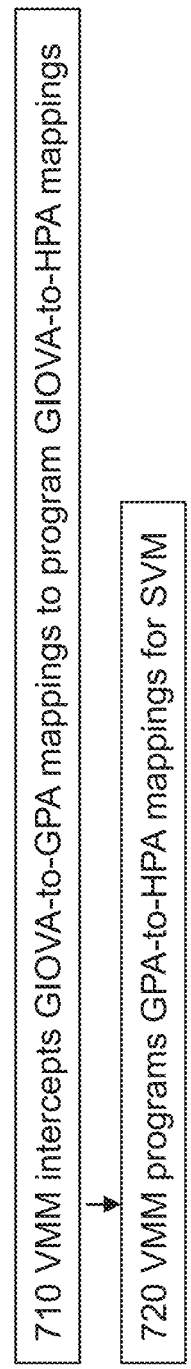
FIGS. 7A and 7B are flow diagrams illustrating software-based approaches to I/O virtual address (IOVA) virtualization according to embodiments of the invention.
Figure 7B:
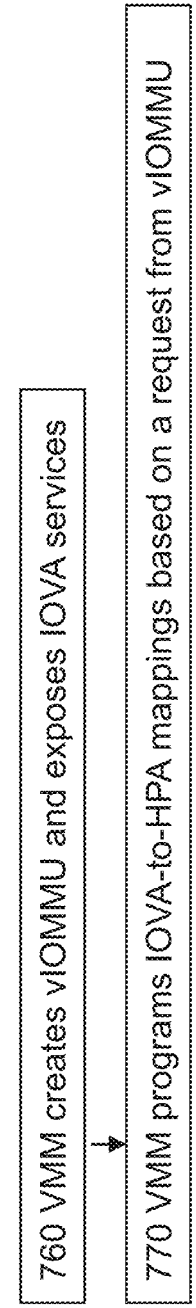
Figure 8:
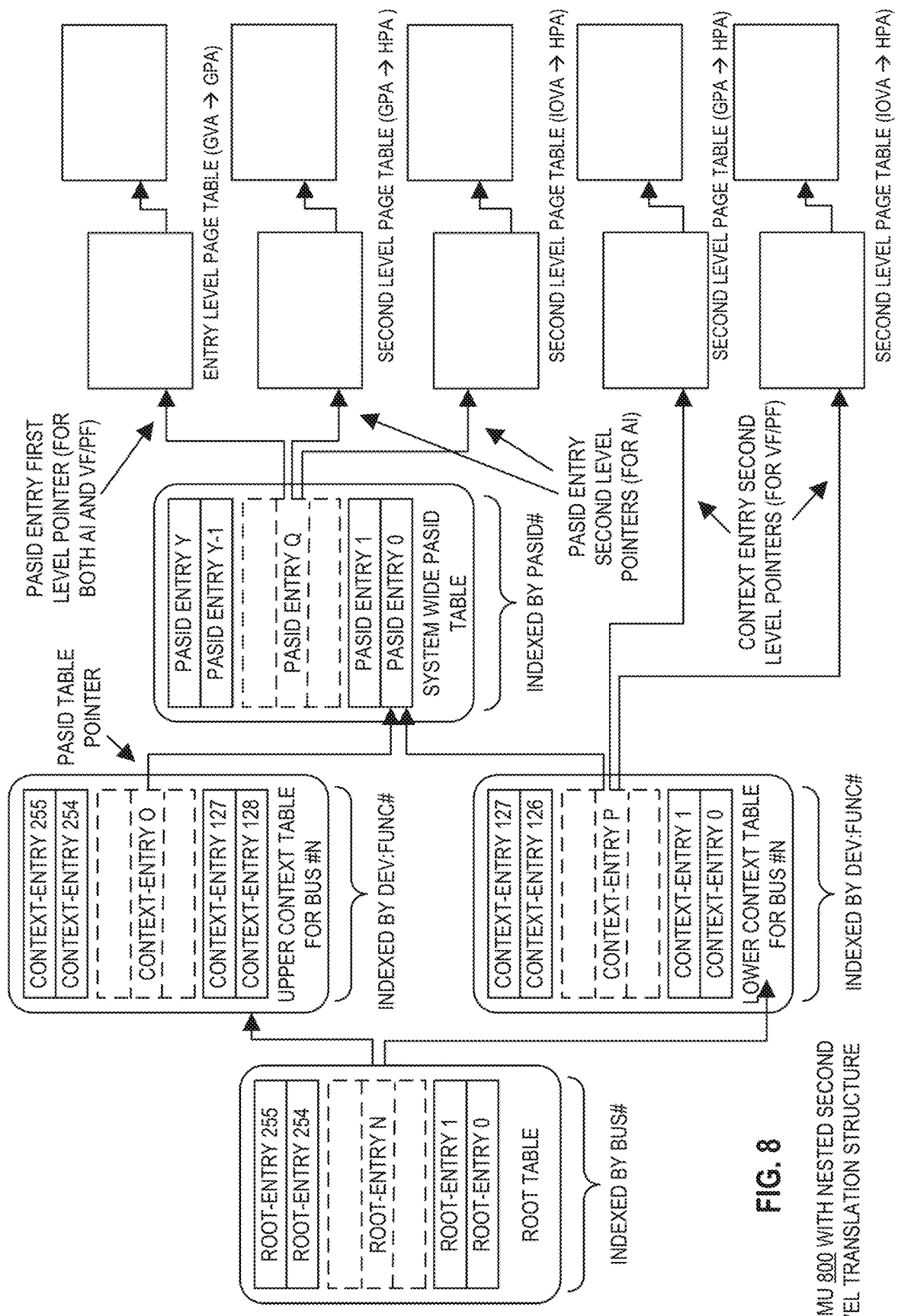
FIG. 8 is a block diagram illustrating a hardware-based approach to IOVA virtualization according to an embodiment of the invention.

FIGS. 7A, 7B, and 8 illustrate IOVA virtualization according to embodiments of the invention. The software-based embodiment of FIG. 7A includes shadowing of the vIOM- MU's second-level table (GIOVA-to-GPA) to create (GIOVA-to-HPA) mappings in the physical IOMMU's corresponding second-level table, i.e., for VFs/PFs, the context entry second-level table is used, and for AIs, the PASID entry second-level table is used. The software-based embodiment of FIG. 7B includes a vIOMMU utilizing VMM services to add or remove mappings in an IOVA-to-HPA table allocated by the VMM representing I/O space of the VM or the I/O space of device and the VMM configuring a physical IOMMU's context entry (for VFs/PFs) and PASID entry (for AIs) to use this table for second-level translation. The hardware-based embodiment of FIG. 8 includes enhancing the physical IOMMU to perform nested second level (GIOVA-to-GPA-to-HPA) translations from the vIOMMU's second-level table (GIOVA-to-GPA) to the physical IOMMU's second level (GPA-to-HPA) table.

FIG. 7A illustrates a software-based approach to IOVA virtualization according to an embodiment of the invention. In method 700, the VMM shadows the GIOVA-to-GPA page table from the vIOMMU in the VM to a GIOVA-to-HPA page table in the physical IOMMU in the host. In block 710, when the VM configures the vIOMMU's GIOVA-to-GPA mappings, the VMM intercepts and programs the corresponding GIOVA-to-HPA mappings in the physical IOMMU's corresponding context entry's second-level table for the VF/PF. In block 720, if the VM also uses SVM on the VF/PF, the VMM programs the GPA-to-HPA mappings in the VM's shadow PASID table's corresponding scalable PASID entry second-level table. Both the guest PASID entry and the corresponding host PASID entry are configured to point to the GPA-to-HPA table (arrows 570 in shadow PASID tables of FIG. 5B). This approach enables the VM to use both IOVA and SVM on the VF/PF simultaneously. It may be preferred over a hardware approach using nested translation, as described below, if the VM updates its GIOVA-to-GPA table infrequently.

FIG. 7B illustrates a software-based approach to IOVA virtualization according to an embodiment of the invention. In block 760 of method 700, the VMM creates a vIOMMU and exposes IOMMU services for GVA and IOVA operations that are invoked by vIOMMU software running inside the VM. The VMM creates an IOVA-to-HPA table that is representing I/O space of the VM and configures the physical IOMMU's context-entry (for VFs/PFs) or PASID entry (for AIs) to use this table. In block 770, the VMM adds or removes a mapping in the IOVA-to-HPA table based on the request from the vIOMMU.

FIG. 8 illustrates a hardware-based approach to IOVA virtualization according to an embodiment of the invention. Physical IOMMU 800 is enhanced to support a 2nd-over-2nd nested translation, i.e., IOMMU 800 has the ability to do GIOVA-to-GPA-to-HPA nested translations. The scalable PASID entry is extended to include an additional second level pointer for GIOVA nested translation requests with a PASID (for scalable IOVAs). Additionally, the scalable context entry is extended to include an additional second level pointer for the GIOVA nested translation requests without PASID (for VF/PF). Since now there are different tables for IOVA-to-HPA and GPA-to-HPA, it allows VMs to use both IOVA and SVM on the assigned I/O device (VF/PF or AI). This approach may be preferred over a software approach, as described above, because it can perform GIOVA-to-GPA-to-HPA translations without VMM intercept and shadowing overhead.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

Figure 9A:
FIG. 9A is a block diagram illustrating both an exemplary in-order pipeline and an exemplary register renaming, out-of-order issue/execution pipeline according to embodiments of the invention.
Figure 9B:
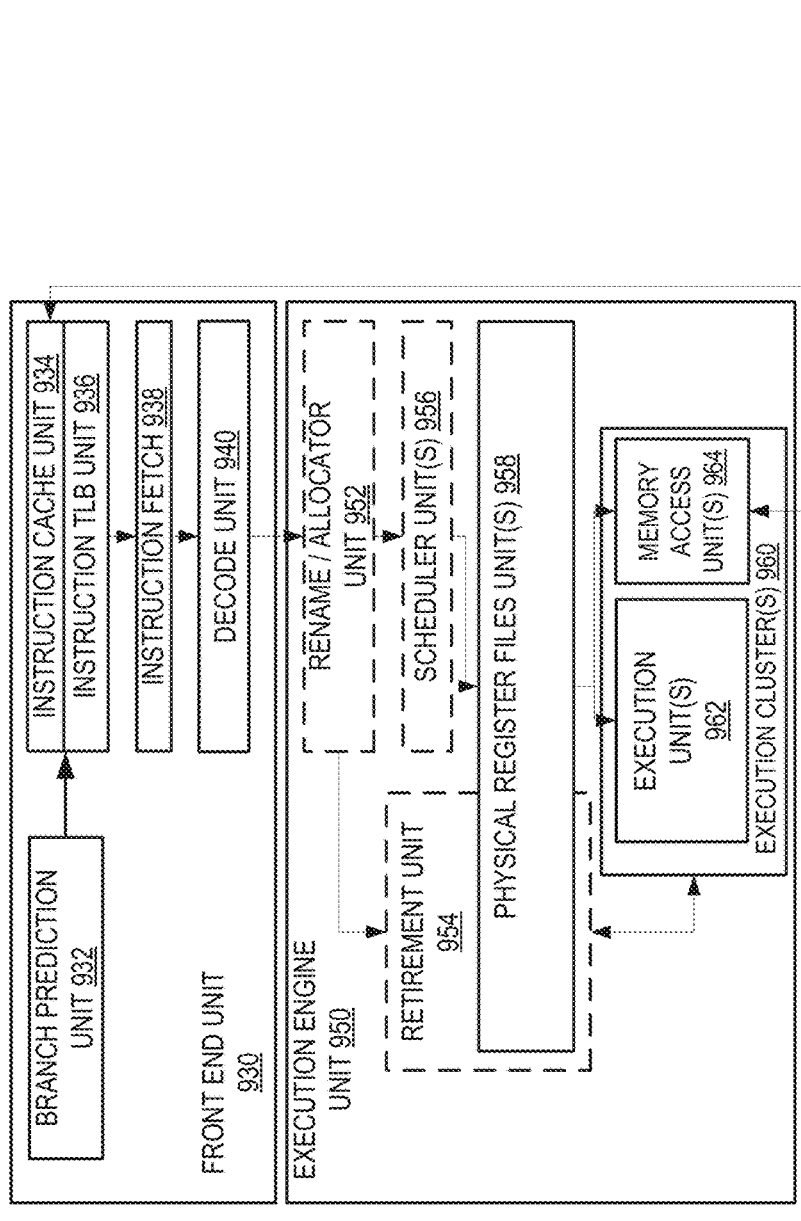
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932, which is coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
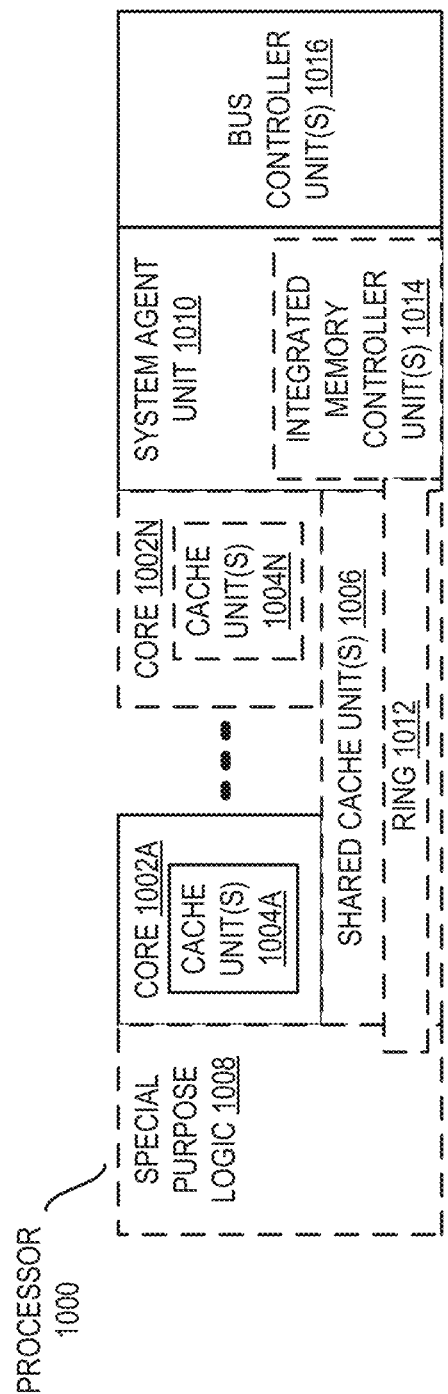
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008 (integrated graphics logic 1008 is an example of and is also referred to herein as special purpose logic), the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
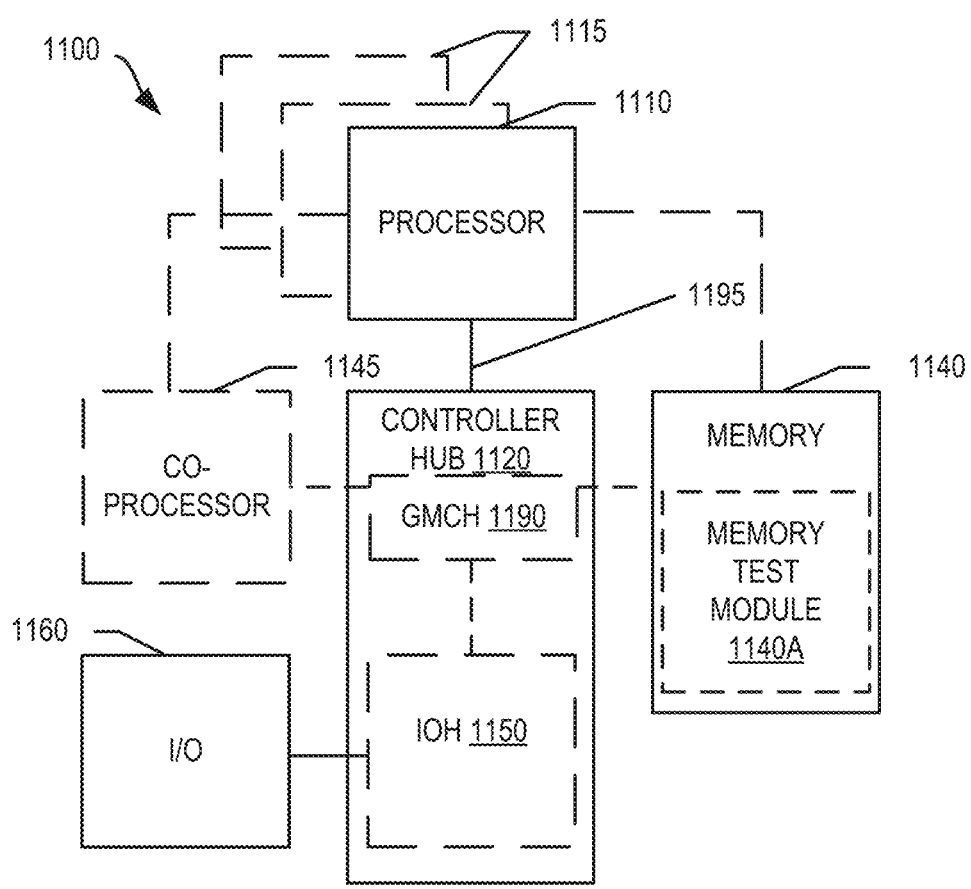
FIG. 11 is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment, the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
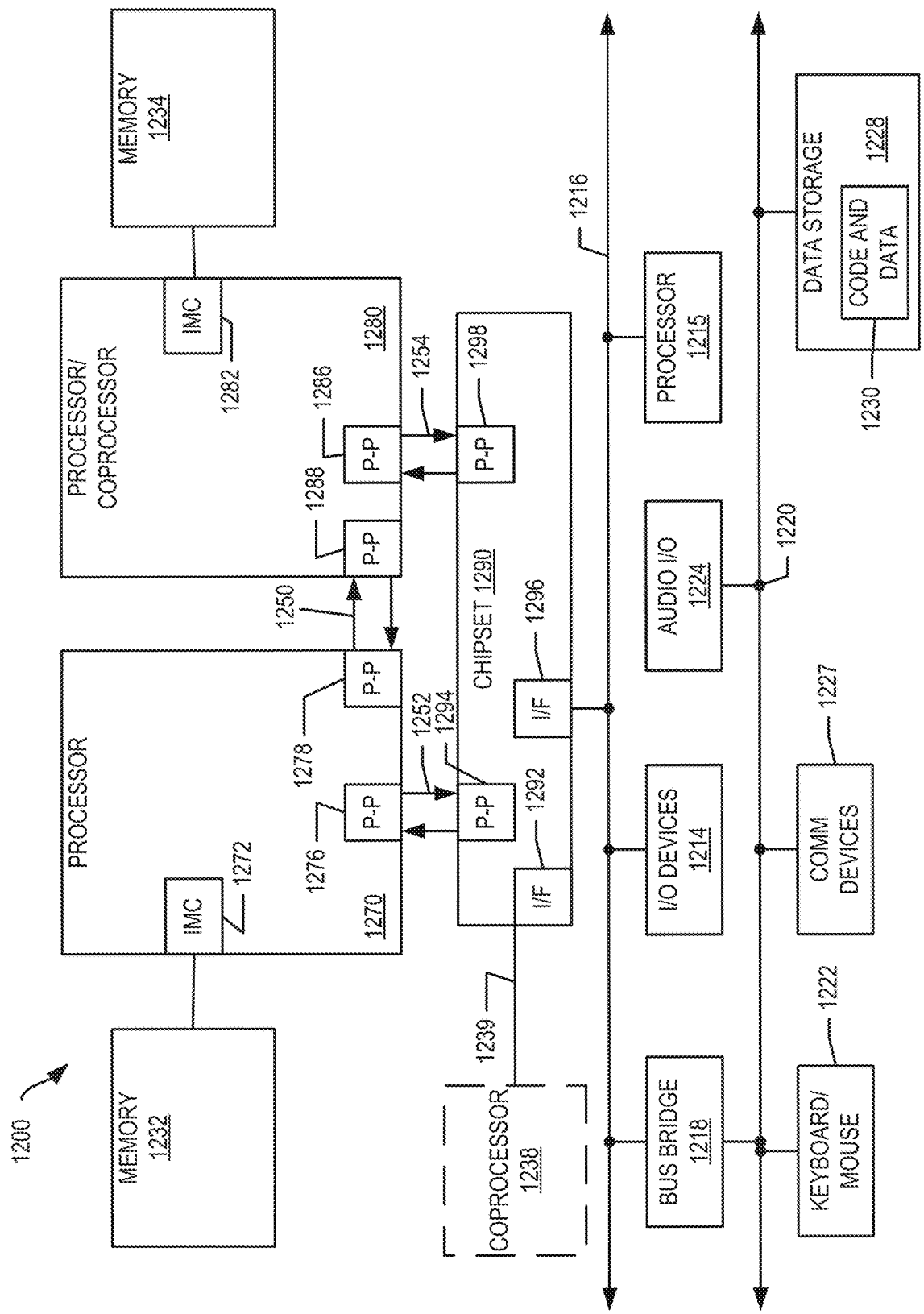
FIG. 12 is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 and coprocessor 1145.

Processors 1270 and 1280 are shown including integrated memory controller (IMC) units 1272 and 1282, respectively.

Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1292. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
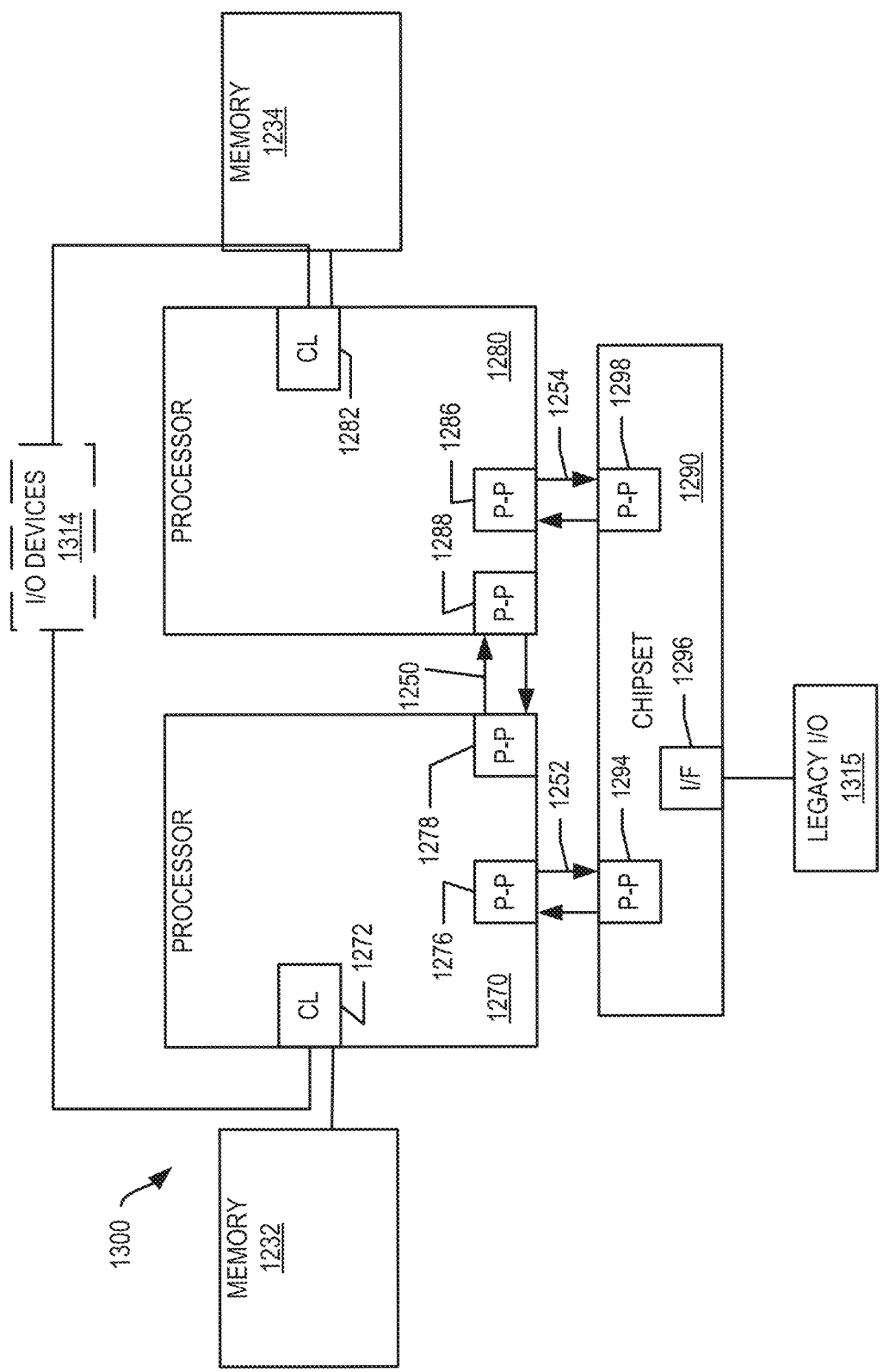
FIG. 13 is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
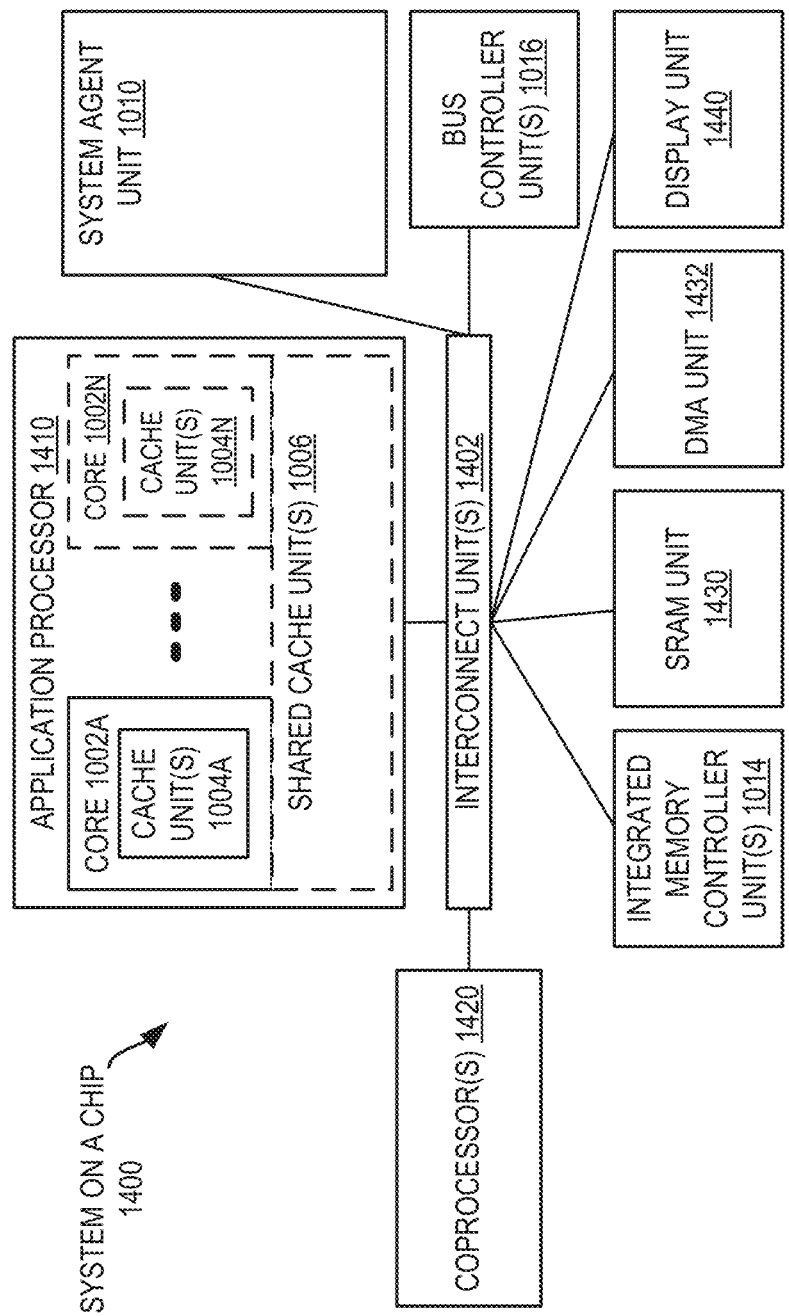
FIG. 14 is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N, which include cache units 1004A-N, and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, an apparatus may include root-table lookup circuitry and context-table lookup circuitry. The root-table lookup circuitry is to find a root-entry in a root table. The root-entry to include a context pointer to the context table. The context-table lookup circuitry is to find a context entry in a context table. The context entry is to include a first nesting bit to indicate whether the entry is for an address translation in which a process address space identifier (PASID) is to be used. The context entry to also include at least one of a PASID pointer to a PASID table and a page-table pointer to a page-table translation structure. The PASID-table pointer is to be used in response a first nesting-bit indication that the address translation is to use a PASID. The page-table pointer is to be used in response to a second nesting-bit indication that the address translation is not to use a PASID.

The page-table translation structure may be used to translate for single-root I/O virtualization. The page-table translation structure may also be used to translate for a virtual function corresponding to a physical function of an I/O device. The page-table translation structure may also be used to translate a guest physical address to a host physical address. The page-table translation structure may also be used to translate an I/O virtual address to a host physical address. The apparatus may also include PASID-table lookup circuitry to find a PASID-entry in the PASID table, the PASID-entry to include a second nesting bit to indicate whether the entry is to point to a first-level translation structure or a second-level translation structure. The first-level translation structure may be used to translate a guest virtual address to a guest physical address. The first-level translation structure may also be used to translate for a virtual function corresponding to a physical function of an I/O device. The first-level translation structure may also be used to translate for an assignable interface of an I/O device. The second-level translation structure may be used to translate a guest physical address to a host physical address. The second-level translation structure may also be used to translate for a virtual function corresponding to a physical function of an I/O device. The second-level translation structure may also be used to translate for an assignable interface of an I/O device. The second-level translation structure may also be used to translate an I/O virtual address to a host physical address. The second-level translation structure may also be used to translate for a virtual function corresponding to a physical function of an I/O device. The second-level translation structure may also be used to translate for an assignable interface of an I/O device.

In an embodiment, a method may include creating, for a VM by a VMM, a virtual IOMMU corresponding to a physical IOMMU, the virtual IOMMU having a PASID entry width that is smaller than the PASID entry width of the physical IOMMU; and shadowing, by the VMM, a guest PASID from the virtual IOMMU in the physical IOMMU. The method may also include storing, by the VMM, a host PASID in the physical IOMMU, the host PASID corresponding to the guest PASID. The guest PASID may be used by a virtual function of a physical function of an I/O device assigned to the VM. The host PASID may be used by an assignable interface of an I/O device assigned to the VM.

In an embodiment, an apparatus may include means for performing any of the methods described above. In an embodiment, a machine-readable tangible medium may store instructions, which, when executed by a machine, cause the machine to perform any of the methods described above.

In an embodiment, a system may include a plurality of physical I/O devices; a processor to create one or more VMs to which to assign one or more virtual I/O devices to be abstracted from the plurality of physical I/O devices; and an IOMMU to perform address translation to support virtualization of the plurality of I/O devices according to a plurality of translation techniques, the IOMMU including context-table lookup circuitry to find a context entry in a context table, the context entry to include a first nesting bit to indicate whether the entry is for an address translation in which a PASID is to be used, the context entry to also include at least one of a PASID pointer to a PASID table and a page-table pointer to a page-table translation structure, the PASID-table pointer to be used in response a first nesting-bit indication that the address translation is to use a PASID and the page-table pointer to be used in response to a second nesting-bit indication that the address translation is not to use a PASID.

The IOMMU may also include root-table lookup circuitry to find a root-entry in a root table, the root-entry to include a context pointer to the context table. The page-table translation structure may be used to translate for single-root I/O virtualization. The page-table translation structure may also be used to translate for a virtual function corresponding to a physical function of an I/O device. The page-table translation structure may also be used to translate a guest physical address to a host physical address. The page-table translation structure may also be used to translate an I/O virtual address to a host physical address. The IOMMU may also include PASID-table lookup circuitry to find a PASID-entry in the PASID table, the PASID-entry to include a second nesting bit to indicate whether the entry is to point to a first-level translation structure or a second-level translation structure. The first-level translation structure may be used to translate a guest virtual address to a guest physical address. The first-level translation structure may also be used to translate for a virtual function corresponding to a physical function of an I/O device. The first-level translation structure may also be used to translate for an assignable interface of an I/O device. The second-level translation structure may be used to translate a guest physical address to a host physical address. The second-level translation structure may also be used to translate for a virtual function corresponding to a physical function of an I/O device. The second-level translation structure may also be used to translate for an assignable interface of an I/O device. The second-level translation structure may also be used to translate an I/O virtual address to a host physical address. The second-level translation structure may also be used to translate for a virtual function corresponding to a physical function of an I/O device. The second-level translation structure may also be used to translate for an assignable interface of an I/O device.

In an embodiment, a PASID entry may be extended to include a second-level table pointer (when a first-level table pointer is already there) that can be used to do GPA-to-HPA or IOVA-to-HPA translations. In an embodiment, a PASID entry may include a translation-type field to indicate whether the translation is first-level only, second-level only and a nesting bit to indicate if it is a nested translation. In an embodiment, a context entry may be extended to include an RID2PASID field, and the second level table pointer may be removed from the context entry. The RID2PASID field may contain a PASID that may indicate which PASID to use to index into the system-wide PASID table for requests-without-PASID. In an embodiment, the PASID entry may be extended to include another second-level table pointer for doing GIOVA-to-GPA translations, which may be used to do nested IOVA translations (GIOVA-to-GPA-to-HPA) for requests with a PASID. In embodiments, the context entry may be extended to include another second-level table pointer for doing IOVA-to-GPA translations which may be used to do nested IOVA translations (GIOVA-to-GPA-to-HPA) for requests-without-PASID. In embodiments, the VMM may create a separate PASID table per VM to support SVM operations for assigned VFs/PFs. In an embodiment, the VMM may create a single system-wide host PASID table (or a per-IOMMU PASID table but maintain a single host PASID space). In an embodiment, the VM's PASID table is pointed to by the context entry of VFs/PFs assigned to the VM, whereas the system-wide host PASID table is pointed to by the context entry of AIs and other VFs/PFs assigned to the VMM. In an embodiment, the VMM can expose one of the two types of virtual IOMMUs to the VM: a virtual IOMMU that allocates and manages its own guest PASID space and PASID table (for example, a fully emulated Intel IOMMU); and a para-virtualized IOMMU which doesn't maintain its own guest PASID space or PASID table but instead uses VMM services (hypercalls) to get system-wide host PASIDs from the host IOMMU driver. For vIOMMUs of the first type, the VMM shadows the guest PASID table into the VM's physical PASID table, exposes a PASID width which is smaller than the physical PASID width, and configures the guest PASIDs from the guest PASID table into the VM's shadow PASID table. The VMM also configures the host PASID corresponding to the guest PASID into the shadow PASID table to support VFs/PFs that do SVM using EMQCMD and ENQCMDS instructions. For vIOMMUs of the second type, the VMM configures system-wide host PASIDs allocated for the VM in the VM's PASID table to support both ENQCMD/S and non-ENQCMD/S based SVM.

What is claimed is:

1. An apparatus comprising:
a plurality of cores to execute instructions;
an input-output (IO) memory management unit (IOMMU) coupled to the plurality of cores, the IOMMU to provide virtualized access to one or more IO devices of a plurality of IO devices by a plurality of guests operating in a virtual execution environment;
one or more base address registers to store one or more base addresses of a corresponding one or more translation structures of a plurality of translation structures associated with a guest of the plurality of guests, the one or more translation structures to be accessed to perform translation operations;
IOMMU virtualization hardware logic to present a virtual IOMMU (vIOMMU) to the guest, the vIOMMU comprising a virtualized representation of the IOMMU, the one or more translation structures associated with the guest to be stored in a private address space accessible to the vIOMMU, the one or more translation structures including one or more context mapping structures to indicate a mapping between the guest and a corresponding one or more IO devices of the plurality of IO devices to which the vIOMMU provides the guest virtualized access, wherein the vIOMMU is to access the one or more translation structures to perform the translation operations, at least one of the translation operations to cause modifications in one or more IOMMU registers;
the IOMMU further comprising:
an IO translation lookaside buffer (IOTLB) to cache one or more translations from the one or more translation operations;
translation circuitry to perform a first sequence of translation operations in response to a first memory access request originating from a first IO device of the plurality of IO devices and comprising first identification information including a process address space identifier (PASID) value, wherein the first sequence of translation operations includes indexing into a first translation structure of the one or more translation structures using at least a portion of the PASID value of the first memory access request; and
the translation circuitry to perform a second sequence of translation operations in response to a second memory access request originating from a second IO device of the plurality of IO devices and comprising second identification information which does not include a PASID value, wherein the second sequence of translation operations includes assigning a PASID value to the second memory access request and using the assigned PASID value for one or more subsequent operations of the second sequence of translation operations to provide a corresponding translation.

2. The apparatus of claim 1 wherein a first translation structure of the plurality of translation structures comprises a table comprising a plurality of entries with a corresponding plurality of PASID values.

3. The apparatus of claim 2 wherein the first sequence of translation operations further comprises reading at least a portion of a first PASID value of a first entry of the plurality of entries.

4. The apparatus of claim 3 wherein the at least a portion of the first PASID value comprises at least one of: a first-level page-table pointer to a first-level translation structure and a second-level page-table pointer to a second-level translation structure.

5. The apparatus of claim 4 wherein one or more control fields are to indicate whether the first-level page-table pointer or the second-level page-table pointer is to be used.

6. The apparatus of claim 5, wherein the one or more control fields are to indicate whether a nested translation is to be performed using the first-level page-table pointer and one of the page-table pointer and the second-level page-table pointer.

7. The apparatus of claim 4, wherein the second-level translation structure of the PASID entry is to be used to translate a guest physical address or an I/O virtual address to a host physical address.

8. The apparatus of claim 4, wherein the table is one of a plurality of tables, each of the plurality of tables to be created by a virtual machine monitor (VMM) to support memory operations for a virtual function (VF) or a physical function (PF).

9. The apparatus of claim 8, wherein the VMM is to maintain a single system-wide host PASID space.

10. The apparatus of claim 9, wherein the VMM is to assign the VF or PF to the guest and the table is associated with the guest.

11. The apparatus of claim 1, the vIOMMU is to be exposed to the guest by a virtual machine monitor (VMM), vIOMMU to allocate and manage the private address space.

12. An apparatus comprising:
first circuitry to use at least an identifier of a device to locate a context entry, the context entry to include at least one of a page-table pointer to a page-table translation structure and a process address space identifier (PASID); and
second circuitry to use at least the PASID to locate a PASID-entry, the PASID-entry to include at least one of a first-level page-table pointer to a first-level translation structure and a second-level page-table pointer to a second-level translation structure;
wherein the PASID is to be supplied by the device; and
wherein at least one of the apparatus, the context entry, and the PASID entry is to include one or more control fields to indicate whether the first-level page-table pointer or the second-level page-table pointer is to be used.

13. The apparatus of claim 12, wherein the second-level translation structure of a PASID-entry is to be used to translate a guest physical address or an I/O virtual address to a host physical address for an address translation in which a PASID is provided.

14. The apparatus of claim 12, wherein the control fields in the PASID-entry indicate whether a nested translation is to be performed using the first-level page-table pointer and one of the page-table pointer in the context entry and the second-level page-table pointer in the PASID entry.

15. The apparatus of claim 13, wherein the PASID-entry is also to include an additional second-level pointer to a second-level translation table to be used to translate a guest I/O virtual address to a guest physical address for an address translation in which a PASID is provided.

16. The apparatus of claim 13, wherein the context entry is also to include an additional second-level pointer to a second-level translation table to be used to translate a guest I/O virtual address to a guest physical address for an address translation in which a PASID is not provided.

17. The apparatus of claim 12, wherein the PASID table is one of a plurality of PASID tables, each of the plurality of PASID tables to be created by a virtual machine monitor (VMM) to support shared virtual memory (SVM) operations for a virtual function (VF) or a physical function (PF).

18. The apparatus of claim 17, wherein the VMM is to maintain a single system-wide host PASID space.

19. The apparatus of claim 18, wherein the context entry is associated with a VF or PF assigned to a virtual machine (VM) and the PASID table is associated with the VM.

20. The apparatus of claim 18, wherein the context entry is associated with a plurality of assignable interfaces and VF or PF assigned to the VMM and the PASID table is the single system-wide host PASID table.

* * * * *